United States Patent
Porte et al.

(10) Patent No.: US 7,383,679 B2
(45) Date of Patent: Jun. 10, 2008

(54) AIR INTAKE STRUCTURE FOR AIRCRAFT ENGINE

(75) Inventors: Alain Porte, Colomiers (FR); Robert Andre, Lacroix Falgarde (FR)

(73) Assignee: Airbus France, Toulouse (FR)

( * ) Notice: Subject to any disclaimer, the term of this patent is extended or adjusted under 35 U.S.C. 154(b) by 594 days.

(21) Appl. No.: 11/085,572

(22) Filed: Mar. 22, 2005

(65) Prior Publication Data

US 2005/0218261 A1 Oct. 6, 2005

(30) Foreign Application Priority Data

Mar. 29, 2004 (FR) .................................. 04 50613

(51) Int. Cl.
*F02K 3/02* (2006.01)
(52) U.S. Cl. ................. 60/226.1; 244/53 B; 415/213.1
(58) Field of Classification Search ............... 60/226.1; 415/182.1, 213.1–215.1, 220, 119; 244/53 B
See application file for complete search history.

(56) References Cited

U.S. PATENT DOCUMENTS

| | | | |
|---|---|---|---|
| 4,749,150 A * | 6/1988 | Rose et al. ............... 244/53 B |
| 5,581,054 A * | 12/1996 | Anderson et al. ........... 181/213 |
| 5,743,488 A * | 4/1998 | Rolston et al. ........... 244/53 B |
| 6,027,078 A * | 2/2000 | Crouch et al. ............... 244/204 |
| 6,328,258 B1 | 12/2001 | Porte |
| 2001/0003897 A1* | 6/2001 | Porte et al. ............... 60/39.093 |
| 2002/0012587 A1* | 1/2002 | Farrar et al. ................. 415/220 |
| 2004/0255572 A1* | 12/2004 | Porte .......................... 60/226.1 |
| 2005/0269443 A1* | 12/2005 | Porte ......................... 244/53 B |

* cited by examiner

*Primary Examiner*—William H Rodríguez
(74) *Attorney, Agent, or Firm*—Oblon, Spivak, McClelland, Maier & Neustadt, P.C.

(57) ABSTRACT

Stiffening means are added into an air intake structure of an aircraft engine nacelle, to stiffen this structure, in order to prevent any modification to the shape of the structure, for example following suction of the intake lip inwards the fan duct. The stiffening means pass through the structure diagonally, in other words one of their ends is fixed, for example, in the forward direction and externally, and the other end is fixed in the aft direction and internally. These stiffening means may be added to the existing forward and aft stiffening frames.

20 Claims, 2 Drawing Sheets

AIR INTAKE STRUCTURE FOR AIRCRAFT ENGINE

TECHNICAL FIELD

The invention relates to nacelles that could be used for any type of engine or turbojet, particularly in aircraft.

More precisely, the invention relates to the air intake structure of the nacelle and its stiffness.

BACKGROUND ART

As shown very diagrammatically in perspective in FIG. 1 on the attached drawings, an aircraft engine comprises a central part 1 in which the engine itself is housed, and an annular part 2 called the nacelle surrounding the central part of the engine coaxially and delimiting an annular duct 3, called the fan duct, with it. A fan, driven by the central part 1 of the engine, is located in this duct 3 at the fan cowls.

The front part of the nacelle 2 forms an air intake structure 4. This structure has the particular function of controlling aerodynamic air flow firstly towards the fan duct 3, and secondly towards the outside of the nacelle 2. This type of structure normally comprises an air intake lip 5 (see FIG. 2) that is added onto the inner casing 6 and the outer casing 7 of the nacelle 2. By convention, if not mentioned otherwise, the terms "inner" and "outer" will be used to denote the position or orientation of parts with respect to the fan duct 3 of the air intake structure 4.

Normally, the inner casing 6, i.e. the side of the fan duct 3 at the aft end of the air intake lip 5, is composed of a sound proofing panel. This panel has its own structure capable of attenuating noise produced by the central part of the engine, and particularly by the fan. In practice, this structure is normally of the composite sandwich type, in other words the panel 6 comprises a honeycomb core.

The air intake lip 5 has a cross section in the shape of a U open in the aft direction. It forms the outer casing of the forward part of the air intake structure 4. It shares air between the part that penetrates into the fan duct and the part that flows around the nacelle 2.

A forward stiffening frame 8 and an aft stiffening frame 9 can pass through the structure between the inner and outer casings, in order to stiffen the structure 4. By convention, the terms "forward" and "aft" will be used throughout this text with reference to the forward and aft direction of the engine.

The forward stiffener frame 8 is placed inside and towards the aft of the air intake lip 5, at the intake end of the annular part formed by the casings 6 and 7. The aft stiffening frame 9 is placed inside the nacelle 2 close to the fan cowls, forward from the engine attachment area; the engine attachment area is located at an attachment area between the air intake and the fan cowls, but actually outside the sound proofing panel of the inner casing 6 for which it would destroy the characteristics. The function of the stiffening frames 8, 9 is to provide mechanical strength for the forward part of the nacelle and help preserve its shape and size. Consequently, they may be fixed using rivets or screws, for example to the nacelle 2, or for the forward stiffening frame 8 directly to the air intake lip 5.

Some examples of such an air intake structure are shown in American patent U.S. Pat. No. 6,328,258.

In flight, when the engine stops and starts to "windmill" due to the aircraft speed, a suction phenomenon occurs at the air intake 4 that draws the air intake lip 5 inwards towards the inside of the fan duct 3. Since the component parts of the nacelle are fixed to each other, the suction of the air intake lip 5 causes a deflection of each part from its normal position. This causes large clearances that degrade the aerodynamics of the nacelle as a whole and introduces a parasite drag. Furthermore, this deviation applies load to structure components, and forces generated by this marginal operating case have to be taken into account.

With the arrival of aircraft engines with a greater by-pass ratio and/or a greater fan diameter (for example engines for use on the heaviest wide body type aircraft), deflections applied to the air intake structure are greater than they were in the past. It is found that the forward stiffening frame 8 and the aft stiffening frame 9 cannot resist the deflections applied in new engines and that existing techniques do not provide a solution for overcoming this disadvantage.

SUMMARY OF THE INVENTION

The purpose of the invention is an air intake structure in which the connection between the lip and the nacelle is made such that the above disadvantages are very much reduced. In particular, in the context of the invention, windmilling of the engine which tends to deform the air intake structure inwards into the fan duct no longer causes suction of the air intake lip.

In accordance with the invention, this result is obtained by adding extra means to stiffen the air intake structure of an aircraft nacelle positioned so as to oppose deflection generated by suction at the air intake, including suction of the air intake lip. More particularly, the air intake structure according to one aspect of the invention includes an annular part composed of an outer casing and an inner casing and means of stiffening it fixed at their ends to the inner and outer casings, the attachment at one end being made at the air intake and at the other end at the fan cowls.

Advantageously, the structure comprises an air intake lip to achieve the aerodynamic profile. It may also include forward and/or aft stiffening frames. According to one possibility, the additional means to stiffen the structure are fixed jointly to the forwards and/or aft stiffening frames.

Preferably, the additional stiffening means are in the form of connecting rods, preferably composite, and they are attached using rivets, which simplifies the sizing and placement of the different additional elements.

BRIEF DESCRIPTION OF THE DRAWINGS

The attached figures will help to better understand the invention, but they are only given for guidance and they are in no way restrictive.

DETAILED DESCRIPTION OF PREFERRED EMBODIMENTS

Figure 1:
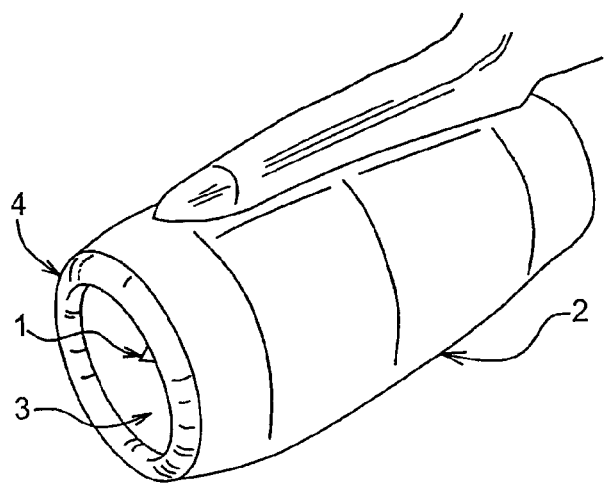
FIG. 1, already described, shows an aircraft engine.
Figure 2:
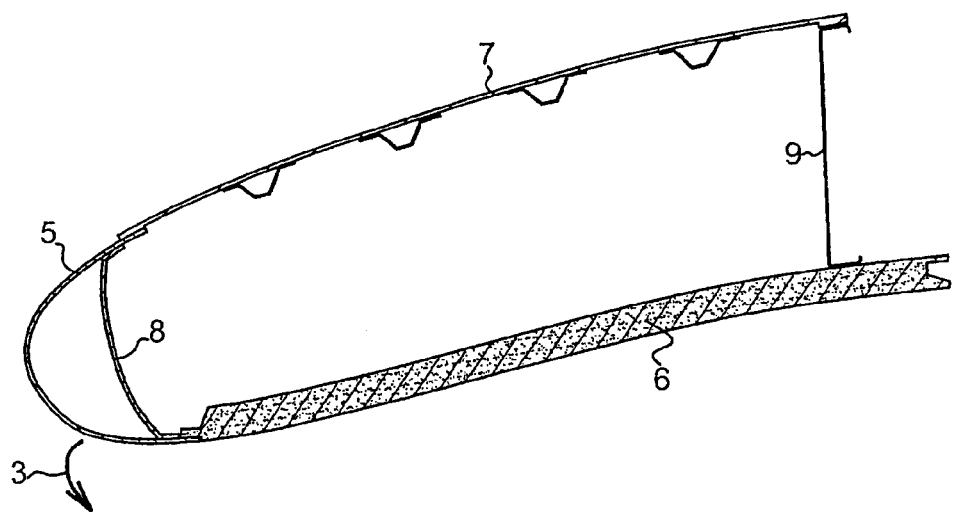
FIG. 2, already described, is a longitudinal sectional view illustrating a first known embodiment of an air intake structure that illustrates existing stiffeners.

In looking at the structure presented in FIG. 2 described above, it is clear that the stiffness added by the stiffening frames 8 and 9 may be insufficient, particularly if a mechanical constraint is acting on the air intake structure 4 in a direction not protected by the stiffening frames 8 and 9, for example in the longitudinal direction. In particular, an intense suction, for example caused by the engine stopping and the fan windmilling, tends to bring the air intake lip 5 inwards into the fan duct 3, as shown by the arrow in FIG. 2; there can be a risk of damaging the structure, particularly due to compression of the sound proofing panel 6, and by tension forces on the outer casing 7.

In order to prevent suction of the air intake lip when the fan is windmilling, which is one of the harmful effects that occurs on the nacelle structure, according to the invention additional means are provided to stiffen the structure so as to oppose deflection of the air intake lip 5 under the influence of said suction, which consists of fastening said additional means "diagonally" with respect to the existing stiffening frames.

Figure 3:
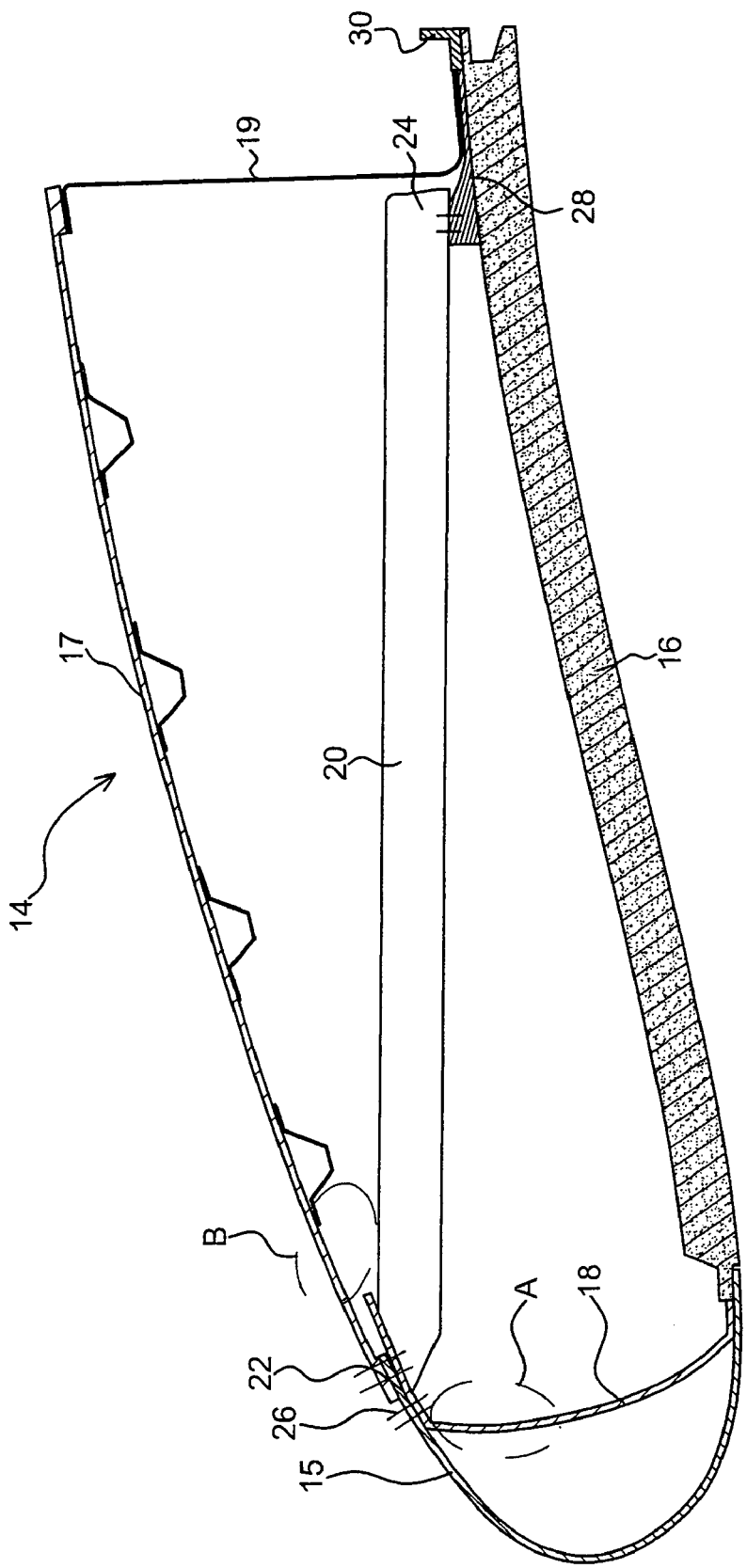
FIG. 3 shows an example embodiment of an air intake structure according to the invention.

One embodiment is presented in FIG. 3. Note that the air intake structure 14 conforming with the invention comprises an inner casing 16, advantageously made of an sound proofing panel, and an outer casing 17. Similarly, an air intake lip 15 preferably forms the end of the structure 14. A forward stiffening frame 18 and an aft stiffening frame 19 are present in this embodiment, but they are not essential.

In the example shown, the additional means of stiffening the structure comprise the bar 20 and its attachment elements. These stiffening means may consist of a force resisting rod made for example of a composite material, and designed to resist suction forces generated by the engine windmilling; the stiffening means may consist of several connecting rods or bars, or it may also consist of a tapered casing; the stiffening means may be made of metal or an alloy or a composite material, chosen to satisfy the required properties. Similarly, the associated attachments, for example rivets, are designed to resist tension stresses resulting from the suction.

The first end 22 of the stiffening means 20 is fixed to the side of the outer casing 17 and close to the forward stiffening frame 18; their second end 24 is fixed to the inner casing 16 and close to the aft stiffening frame 19. Thus, when suction conditions occur at the air intake lip 15, the additional stiffening means 20 oppose the inwards movement of the lip 15 into the fan duct 3; therefore the deflection of the component parts of the nacelle 2 does not occur.

In this example embodiment, the ends 22 and 24 of the additional stiffening means 20 are fixed at locations very close to the attachment locations of the forward stiffening frame 18 and the aft stiffening frame 19. However, some freedom with the location of the attachments of said ends is acceptable.

Thus, in a first variant embodiment, the end 22 of the stiffening bar 20 may be fixed directly on the forward stiffening frame 18, particularly in its upper half, symbolized by the area A in FIG. 3. It is also possible to fix the stiffening bar 20 by the same attachment means 26 as those used for the forward stiffening means 18 as shown in the figure.

In another variant embodiment, the end 22 of the bar 20 may be fixed directly onto the outer casing 17, close to the forward end of the annular part formed by the two casings, in other words at any position in zone B.

Concerning the attachment of the second end around the aft stiffening means 19, similar options are available with attachments further forward than the frame 19, directly on the frame 19 or even by the same attachment means 28 as shown in the figure.

It is clear that it would also be possible to fix the end 22 close to the forward stiffening frame 18 and on the inner casing 16 end, while the second end 24 would be fixed on the outer end of the aft stiffening frame 19. The inwards movement of the air intake lip 15 into the fan duct 3 will be stopped in the same way as in the previous examples, due to the additional stiffening means 20.

Although shown, the forward stiffening frame 18 could be eliminated; in this case the other stiffening means 20 are placed aft from the aft end of the air intake lip 15 (as opposed to the forward end of the said lip in contact with the aerodynamic fluid) The same alternative would arise with elimination of the aft stiffening frame 19, and positioning of the additional stiffening means around the fan cowls, forward from the engine attachment area 30.

In this respect, it is possible to use the elements present for attachment of the engine, for example an engine attachment plate on the inner casing 16, and to fix the bar 20 directly onto an extension of said attachment elements. This would maintain the integrity of the sound proofing panel 16 as much as possible.

Moreover, the shapes of the different elements, for example the stiffening frames, are only given for guidance; the forward and aft stiffening frames may be made in any usual manner, or they may be made taking account of the presence of additional stiffening means to facilitate their integration, for example by the presence of a recess for positioning them.

The invention claimed is:

1. Air intake structure for an aircraft engine, comprising:
an annular part defining a fan duct that comprises an intake end,
an outer casing,
an inner casing provided with an engine attachment area remote from the intake end, and
stiffening means comprising a first end fixed to the inner casing and a second end fixed to the outer casing,
wherein one of the first or second ends of the stiffening means is fixed at the intake end of the annular part and the other of the first or second ends of the stiffening means is fixed at the attachment area.

2. Structure according to claim 1 comprising also at least one forward stiffening frame one end of which is fixed to the inner casing and a second end is fixed to the outer casing, the two ends being fixed at the intake end.

3. Structure according to claim 2 in which the stiffening means are fixed to an end on the forward stiffening frame.

4. Structure according to claim 2 in which fastening elements fix the stiffening means and the forward stiffening frame onto one of the casings.

5. Structure according to claim 2 in which the forward stiffening frame is fixed between the forward end and the location at which the stiffening means are fixed at the intake end.

6. Structure according to claim 1 comprising also at least one aft stiffening frame, a first end of which is fixed to the inner casing at the attachment area and a second end of which is fixed to the outer casing, the aft stiffening frame defining an line approximately normal to the casings.

7. Structure according to claim 6 in which one end of the stiffening means is fixed to the aft stiffening frame.

8. Structure according to claim 6 in which fastening elements fix the stiffening means and the aft stiffening frame onto one of the casings.

9. Structure according to claim 8 comprising an engine attachment plate on the inner casing on which stiffening means and the aft stiffening frame are fixed.

10. Structure according to claim 1 in which the stiffening means include a connecting rod made of composite material.

11. Structure according to claim 10 comprising a plurality of connecting rods.

12. Structure according to claim 1 comprising an air intake lip at the intake end.

13. Structure according to claim 1 in which the stiffening means are fixed to the casings through rivets.

14. Structure according to claim 1 in which the inner casing comprises a sound-proofing panel.

15. Air intake structure for an aircraft engine, comprising:
an annular part defining a fan duct,
an air intake lip,
an outer casing,
an inner casing provided with an engine attachment area,
a forward stiffening frame, a first end of which is fixed to the inner casing and a second end of which is fixed to the outer casing, the two ends being fixed at the intake lip,
an aft stiffening frame, a first end of which is fixed to the inner casing at the attachment area and a second end of which is fixed to the outer casing, the aft stiffening frame defining a line approximately normal to the casings,
and stiffening means comprising a first end fixed to the inner casing at the aft stiffening frame and a second end fixed to the outer casing at the forward stiffening frame.

16. Structure according to claim 15 in which the stiffening means are fixed to the casings through rivets.

17. Structure according to claim 15 in which the inner casing comprises a sound proofing panel.

18. Air intake structure for an aircraft engine, comprising:
an annular part defining a fan duct,
an air intake lip,
an outer casing,
an inner casing provided with an engine attachment area,
and at least a connecting rod made of a composite material, each connecting rod comprising a first end fixed to the inner casing- and a second end fixed to the outer casing and such that one of its ends is fixed at the intake lip and its other end is fixed at the attachment area.

19. Structure according to claim 18 comprising also a forward stiffening frame fixed at the intake lip between the inner casing and the outer casing, and/or an aft stiffening frame fixed at the attachment area between the inner casing and the outer casing.

20. Structure according to claim 18 in which the inner casing comprises a sound proofing panel.

* * * * *